United States Patent Office 2,826,576
Patented Mar. 11, 1958

2,826,576

3,3'ALKYLENEBIS(3,4-DIHYDRO-2H-1,3-BENZOXAZINES)

Raymond H. Rigterink, Midland, Mich., assignor to The Dow Chemical Company, Midland, Mich., a corporation of Delaware No Drawing. Application May 6, 1957
Serial No. 657,047

7 Claims. (Cl. 260—244)

This invention relates to 3,3'-alkylenebis(3,4-dihydro-2H-1,3-benzoxazines) having the formula

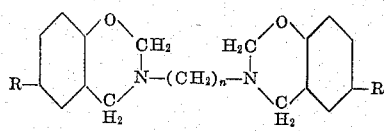

In this and succeeding formulae, $n$ is an integer from 2 to 6, inclusive and R represents alkyl or cyclohexyl. The expression alkyl is employed in the present specification and claims to refer to aliphatic hydrocarbon radicals containing from 1 to 8 carbon atoms, inclusive. These compounds are crystalline solids or liquids somewhat soluble in many common organic solvents and of very low solubility in water. The new compounds are useful as parasiticides and are adapted to be employed in dust and liquid compositions for the control of many undesirable organisms such as *Alternaria solani*.

The new compounds may be prepared by causing a reaction between an alkylenediamine having the formula

and formaldehyde, or a suitable formaldehyde yielding substance, to form an intermediate formaldehyde-amine condensation product. The intermediate product is then caused to react with a para substituted phenolic compound having the formula

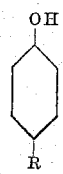

to form the desired product and water of reaction.

In carrying out the first step of the reaction, the alkylenediamine is intimately contacted with formaldehyde, or a formaldehyde yielding substance such as paraformaldehyde, and preferably in the presence of an inert solvent such as methanol, ethanol or dioxane as a reaction medium. The contacting of the reactants is carried out with stirring and cooling and at a temperature of from 0° to 70° C. Good results are obtained when reacting one molecular proportion of the diamine with four molecular proportions of formaldehyde. The formaldehyde may be employed in any readily available form such as formalin, trioxane and paraformaldehyde. The amount of formaldehyde is calculated on the basis of the monomer unit.

In carrying out the second step of the reaction, the phenolic compound or a solution thereof in one of the above-named solvents is added portionwise to the reaction mixture, prepared as described above. In such operations, two molecular proportions of phenol are employed for each molecular proportion of diamine used in the preparation of the intermediate formaldehyde-amine product. The reaction takes place smoothly at the temperature range of from 30° to 100° C. Upon completion of the reaction, the reaction mixture may be fractionally distilled under reduced pressure to remove the low boiling constituents and obtain the desired product as a liquid or crystalline residue. The desired product may be purified in conventional fashion such as washing with dilute aqueous alkali and water and recrystallization from various organic solvents.

The following examples illustrate the invention but are not to be construed as limiting.

*Example 1.*—*3,3 - ethylenebis(6 - tertiarybutyl - 3,4 - hydro - 2H - 1,3 - benzoxazine)*

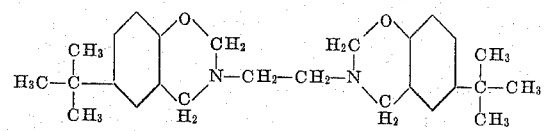

Sixty grams of paraformaldehyde (equivalent to two moles of HCHO), 1.0 gram of potassium hydroxide and 80 milliliters of methanol were mixed together and heated with stirring to the boiling temperature (65° C.) to obtain a clear solution. The reaction vessel and contents were then cooled to room temperature, and 30.0 grams (0.5 mole) of ethylenediamine added portionwise thereto over a period of about 15 minutes. The addition was carried out with stirring and cooling and at a temperature of from 25° to 30° C. Upon completion of the addition, 150.2 grams (1 mole) of p-tertiary-butylphenol was added thereto over a 15 minute period. Following the addition, the mixture was heated with stirring at the boiling temperature (65° C.) and under reflux for 15 minutes. The reaction mixture was then cooled in an ice bath whereupon a heavy gummy oil separated in the reaction mixture. The oil was separated and 500 milliliters of aqueous 10 percent sodium hydroxide and 250 milliters of toluene were successively added with stirring thereto and the resulting heterogeneous mixture warmed to about 60° C. After the heating, the organic layer was decanted and thereafter successively washed with aqueous 5 percent sodium hydroxide and water. The washed mixture was then fractionally distilled under pressure to a final temperature of 100° C. at 25 millimeters' pressure to remove low boiling constituents and obtain a 3,3'-ethylenebis (6 - tertiary - butyl - 3,4 - dihydro - 2H - 1,3 - benzoxazine) product as a dark red oily residue. 3,3'-ethylenebis(6 - tertiary - butyl - 3,4 - dihydro - 2H - 1,3 - benzoxazine) has a molecular weight of 408.

*Example 2.*—*3,3 - ethylenebis(3,4 - dihydro - 6 - methyl-2H - 1,3 - benzoxazine)*

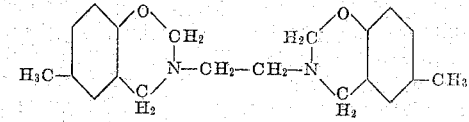

Sixty grams of paraformaldehyde (equivalent to two moles of HCHO), 1.0 gram of sodium hydroxide and 250 milliliters of methanol were mixed together and heated with stirring to the boiling temperature to obtain a clear solution. The reaction vessel and contents were then cooled to room temperature and 30.0 grams (0.5 mole) of ethylenediamine added portionwise to the reaction mixture over a period of about 15 minutes. The addition was carried out with stirring and cooling and at a temperature of from 25° to 30° C. Upon completion of the addition, 108.0 grams (1.0 mole) of p-cresol was slowly added with stirring and the resulting mixture heated at the boiling temperature (65° C.), and under reflux for 15 minutes. The resulting mixture was then fractionally distilled under reduced pressure to remove the alcohol and 250 milliliters of toluene added to the residue. The toluene and water were thereafter removed by distillation under reduced pressure to obtain a 3,3-ethylenebis(3,4 - dihydro - 6 - methyl - 2H - 1,3 - benzoxazine) product as a gummy solid residue. The latter was washed with aqueous 10 percent sodium hydroxide, and recrystallized from a petroleum hydrocarbon boiling at from 86° to 100° C. The recrystallized product was found to melt at 112°–114° C.

*Example 3.—3,3'-ethylbenebis[3,4-dihydro-6-(1,1,3,3-tetramethylbutyl)-2H-1,3-benzoxazine]*

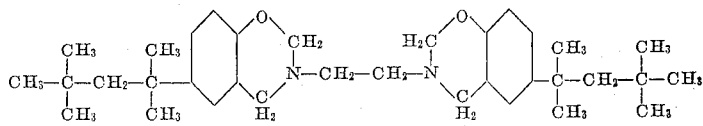

Sixty grams of paraformaldehyde (equivalent to two moles of HCHO), 1.0 gram of potassium hydroxide and 250 milliliters of methanol were mixed together and heated with stirring to the boiling temperature to obtain a clear solution. The reaction vessel and contents were then cooled to room temperature and 30.0 grams (0.5 mole) of ethylenediamine added to the reaction mixture over a period of about 15 minutes. The addition was carried out with stirring and cooling and at a temperature of from 25° to 30° C. Upon completion of addition, 206.3 grams (1.0 mole) of p-(1,1,3,3-tetramethylbutyl)phenol was slowly added with stirring and the resulting mixture heated at the boiling temperature (65° C.) and under reflux for 15 minutes. The resulting reaction mixture was distilled under reduced pressure to remove the solvent and 250 milliliters of toluene then added thereto. The toluene mixture was washed with aqueous 10 percent sodium hydroxide and concentrated by distillation under reduced pressure to obtain a 3,3'-ethylenebis(3,4- dihydro-6- (1,1,3,3- tetramethylbutyl- 2H-1,3-benzoxazine) product as a semi-solid residue. This product was recrystallized from ethyl acetate. The recrystallized product was found to melt at 144°–145° C.

*Example 4.—3,3'-hexamethylenebis(6-cyclohexyl-3,4-dihydro-2H-1,3-benzoxazine)*

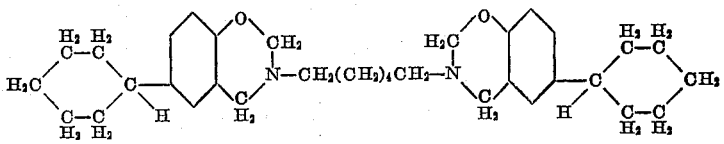

Sixty grams of paraformaldehyde (equivalent to two moles of HCHO), 1.0 gram of potassium hydroxide and 250 milliliters of methanol were mixed together and heated wtih stirring to the boiling temperature to obtain a clear solution. The reaction vessel and contents were then cooled to room temperature and 58.2 grams (0.5 mole) of 1,6-hexanediamine added portionwise to the reaction mixture over a period of about 15 minutes. The addition was carried out with stirring and cooling and at a temperature of from 25° to 30° C. Upon completion of the addition 176.9 grams (1.0 mole) of p-cyclohexylphenol was slowly added with stirring and the resulting mixture heated at the boiling temperature (65° C.) and under reflux for 2 hours. The reaction mixture was then processed as described in Example 3 to obtain a 3,3'-hexamethylenebis(6- cyclohexyl-3,4- dihydro- 2H- 1,3- benzoxazine) product as a liquid residue. 3,3'-hexamethylene bis(6-cyclohexyl-3,4-dihydro-2H-1,3-benzoxazine) has a refractive index $n/D$ of 1.5497 at 25° C. and a molecular weight of 516.

*Example 5.—3,3'-hexamethylenebis(3,4-dihydro-6-methyl-2H-1,3-benzoxazine)*

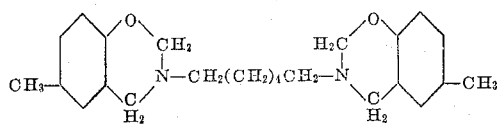

In the manner of Example 4, paraformaldehyde (60 grams; 2 mole equivalents of HCHO), sodium hydroxide (1 gram) and 250 milliliters of methanol were mixed together and heated with stirring at the boiling temperature to obtain a clear solution. The reaction vessel and contents were cooled to room temperature and 58.2 grams of 1,6-hexamethylenediamine added over a period of 15 minutes. The addition was carried out with stirring and cooling and at a temperature of between 25° and 30° C. Thereafter, 108 grams (1.0 mole) of para-cresol was added slowly and with stirring and the resulting mixture heated at the boiling temperature and under reflux for 2 hours. The desired product was separated in exactly the same manner as described in Example 3 to obtain a 3,3'-hexamethylenebis(3,4-dihydro-6-methyl-2H-1,3-benzoxazine) product as an oily liquid residue. 3,3'-hexamethylenebis(3,4-dihydro-6- methyl-2H-1,3- benzoxazine) has a refractive index $n/D$ of 1.5651 at 25° C. and a molecular weight of 380.

The new compounds have been tested and found effective as parasticides. For such use the products may be dispersed on an inert finely divided solid and employed as dusts. Also, such mixtures may be dipersed in water with the aid of a wetting agent, and the resulting aqueous suspensions employed as sprays. In other procedures, the products may be employed as constituents of oil-in-water emulsions, or water dispersions with or without the addition of wetting, dispersing or emulsifying agents. In representative operations, 3,3'-ethylenebis(6-tertiary-butyl-3,4-dihydro-2H-1,3-benzoxazine) was dispersed in an aqueous suspension of spores of *Fusarium oxysporium lycopersici* in an amount sufficient to supply 10 parts by weight of toxicant per million parts by weight of aqueous suspension. Twenty-four hours later, the treated aqueous suspension and an untreated check suspension of the fungal organism were cultured on agar and the cultures incubated at 25° C. After three days of incubation, observations showed a substantially complete control of the fungal organism treated with 3,3'-ethylenebis(6-tertiary-butyl-3,4-dihydro-2H-1,3-benzoxazine). At the time of the observation the check cultures were found to support a heavy growth of the *Fusarium oxysporium lycopersici.*

I claim:
1. A 3,3'-alkylenebis(6-alkyl-3,4-dihydro-2H-1,3- benzoxazine) having the formula

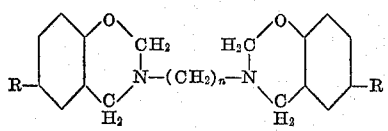

wherein R represents a member selected from the group consisting of alkyl radicals having from 1 to 8 carbon atoms, inclusive, and cyclohexyl, and $n$ is an integer from 2 to 6, inclusive.

2. 3,3'-ethylenebis(6-tertiary-butyl-3,4-dihydro-2H-1,3-benzoxazine).
3. 3,3'- ethylenebis(3,4- dihydro-6-methyl-2H-1,3-benzoxazine).
4. 3,3'- ethylenebis 3,4-dihydro-6- (1,1,3,3- tetramethylbutyl)-2H-1,3-benzoxazine.
5. 3,3'-hexamethylenebis(6-cyclohexyl-3,4-dihydro-2H-1,3-benzoxazine).
6. 3,3'-hexamethylenebis(3,4-dihydro-6-methyl-2H-1,3-benzoxazine).
7. A method for the preparation of a 3,3'-alkylenebis(6-alkyl-3,4-dihydro-2H-1,3-benzoxazine) having the formula

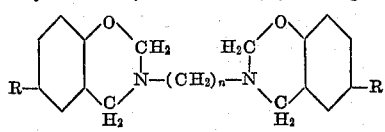

wherein R represents a member selected from the group consisting of alkyl radicals having from 1 to 8 carbon atoms, inclusive, and cyclohexyl, and $n$ is an integer from 2 to 6, inclusive, which comprises the steps of (1) reacting an alkylenediamine containing from 2 to 6 carbon atoms, inclusive, with formaldehyde to produce an intermediate formaldehyde-amine condensation product and (2) reacting this condensation product with an alkylphenol having the formula

wherein R represents a member selected from the group consisting of cyclohexyl and the alkyl radicals containing from 1 to 8 carbon atoms, inclusive.

References Cited in the file of this patent
Burke et al.: J. Am. Chem. Soc., 74, 1518–20 (1952).